United States Patent
Vasudevan et al.

(10) Patent No.: US 7,525,967 B2
(45) Date of Patent: Apr. 28, 2009

(54) TECHNIQUES TO CONTROL ACCESS TO LOGIC

(75) Inventors: Anil Vasudevan, Portland, OR (US); Sujoy Sen, Portland, OR (US); Nimrod Diamant, Kfar-Saba (IL)

(73) Assignee: Intel Corporation, Santa Clara, CA (US)

( * ) Notice: Subject to any disclaimer, the term of this patent is extended or adjusted under 35 U.S.C. 154(b) by 521 days.

(21) Appl. No.: 11/170,294

(22) Filed: Jun. 28, 2005

(65) Prior Publication Data

US 2005/0238019 A1  Oct. 27, 2005

Related U.S. Application Data

(63) Continuation-in-part of application No. 10/815,895, filed on Mar. 31, 2004.

(51) Int. Cl.
*H04J 3/26* (2006.01)
(52) U.S. Cl. .................................... 370/392
(58) Field of Classification Search .................. 370/392
See application file for complete search history.

(56) References Cited

U.S. PATENT DOCUMENTS

| | | | |
|---|---|---|---|
| 6,389,532 B1 * | 5/2002 | Gupta et al. | 713/163 |
| 6,717,917 B1 * | 4/2004 | Weissberger et al. | 370/252 |
| 6,925,085 B1 * | 8/2005 | Krishna et al. | 370/395.32 |

OTHER PUBLICATIONS

Wilson, Carl, "Server Acceleration Technology Overview," Intel Developer Forum, San Francisco, CA, Mar. 1-3, 2005, 21 pages.

* cited by examiner

*Primary Examiner*—Melvin Marcelo
(74) *Attorney, Agent, or Firm*—Caven & Aghevli LLC

(57) ABSTRACT

Techniques are described herein that can be used to control which packets or other data are able to be processed or otherwise utilize logic of a computing device. For example, a signature may be associated with a packet or other data received from a network. The signature and the packet or other data may be transferred to the computing device. Prior to the computing device deciding whether to allow logic such as hardware or software to use, process, or act using the packet or other data, the computing device may inspect the signature to determine if such signature permits such packet or other data to be used, processed, or acted upon.

22 Claims, 6 Drawing Sheets

TECHNIQUES TO CONTROL ACCESS TO LOGIC

CROSS-REFERENCE TO RELATED APPLICATIONS

This application is a continuation-in-part of U.S. patent application Ser. No. 10/815,895 entitled "Accelerated TCP (Transport Control Protocol) Stack Processing", filed Mar. 31, 2004, and claims the benefit of priority thereof.

FIELD

The subject matter disclosed herein relates to techniques of processing packets received by a network component.

RELATED ART

Networking has become an integral part of computer systems. Advances in network bandwidths, however, have not been fully utilized due to overhead that may be associated with processing protocol stacks. Overhead may result from bottlenecks in the computer system from using the core processing module of a host processor to perform slow memory access functions such as data movement, as well as host processor stalls related to data accesses missing the host processor caches. A protocol stack refers to a set of procedures and programs that may be executed to handle packets sent over a network, where the packets may conform to a specified protocol. For example, TCP/IP (Transport Control Protocol/Internet Protocol) packets may be processed using a TCP/IP stack.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
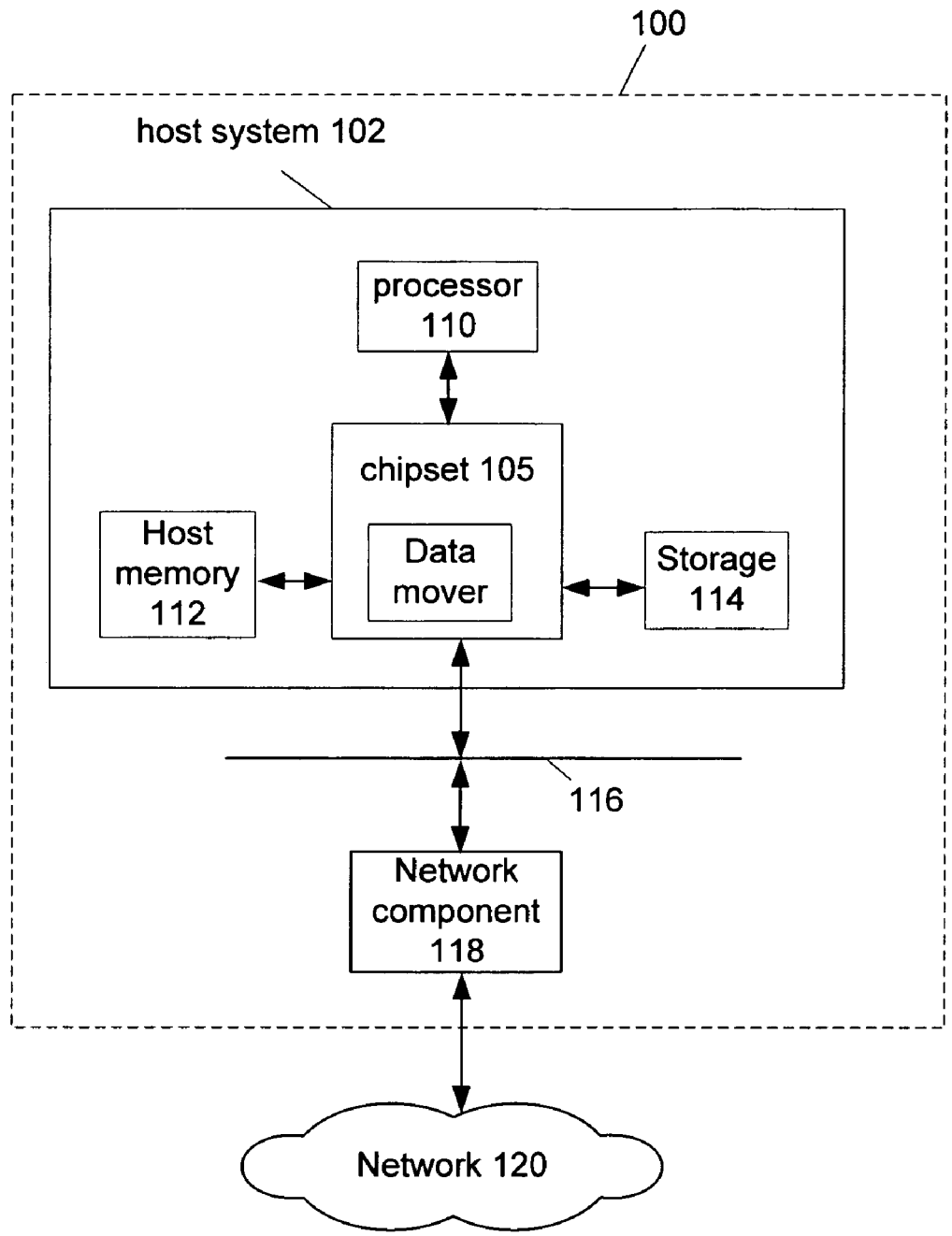
FIG. 1 depicts an example computer system capable to use embodiments of the present invention.

FIG. 1 depicts in computer system 100 a suitable system in which some embodiments of the present invention may be used. Computer system 100 may include host system 102, bus 116, and network component 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance with any of the following protocols: Small Computer Systems Interface (SCSI), Fibre Channel (FC), and/or Serial Advanced Technology Attachment (S-ATA).

In some embodiments, chipset 105 may include data mover logic to perform transfers of information within host memory, from host memory to host system, within host system, or from host system to host memory. As used herein, a "data mover" refers to a module for moving data from a source to a destination without using the core processing module of a host processor, such as processor 110, or otherwise does not use cycles of a processor to perform data copy or move operations. By using the data mover for transfer of data, the processor may be freed from the overhead of performing data movements, which may result in the host processor running at much slower memory speeds compared to the core processing module speeds. A data mover may include, for example, a direct memory access (DMA) engine as described herein. In some embodiments, data mover could be implemented as part of processor 110, although other components of computer system 100 may include the data mover.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may be compatible with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance at least with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more packets to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

In some embodiments, host system 102 includes the capability to control which packets can access the data mover logic of host system 102. For example, in some embodiments, the packets that can use data mover logic of host system 102 are selected based on a signature generated by a peripheral device that provides the packets to the host system. In some embodiments, the data mover logic of host system 102 may further include the capability to perform action requests provided with the packet. For example, the action request may be generated by a peripheral device that provides the packets to the host system.

In some embodiments, network component 118 includes the capability to control which payload and other contents are transmitted from network component 118 or otherwise may utilize logic of network component 118. For example, in some embodiments, a host system or other logic that provides payload and other contents to network component 118 may generate a signature for the payload and other contents. For example, network component 118 may select which payload and other contents are transmitted to a network based in part on the signature. For example, in some embodiments, access to data mover logic of the network component 118 may be controlled by whether the signature provided with the payload and other contents is acceptable. In some embodiments, the data mover logic of network component 118 may further include the capability to perform action requests provided with the payload and other contents. For example, the host system or other logic may generate the action request.

Network 120 may be any network such as the Internet, an intranet, a local area network (LAN), storage area network (SAN), a wide area network (WAN), or wireless network. Network 120 may exchange traffic with network component 118 using the Ethernet standard (described in IEEE 802.3 and related standards) or any communications standard.

Figure 2:
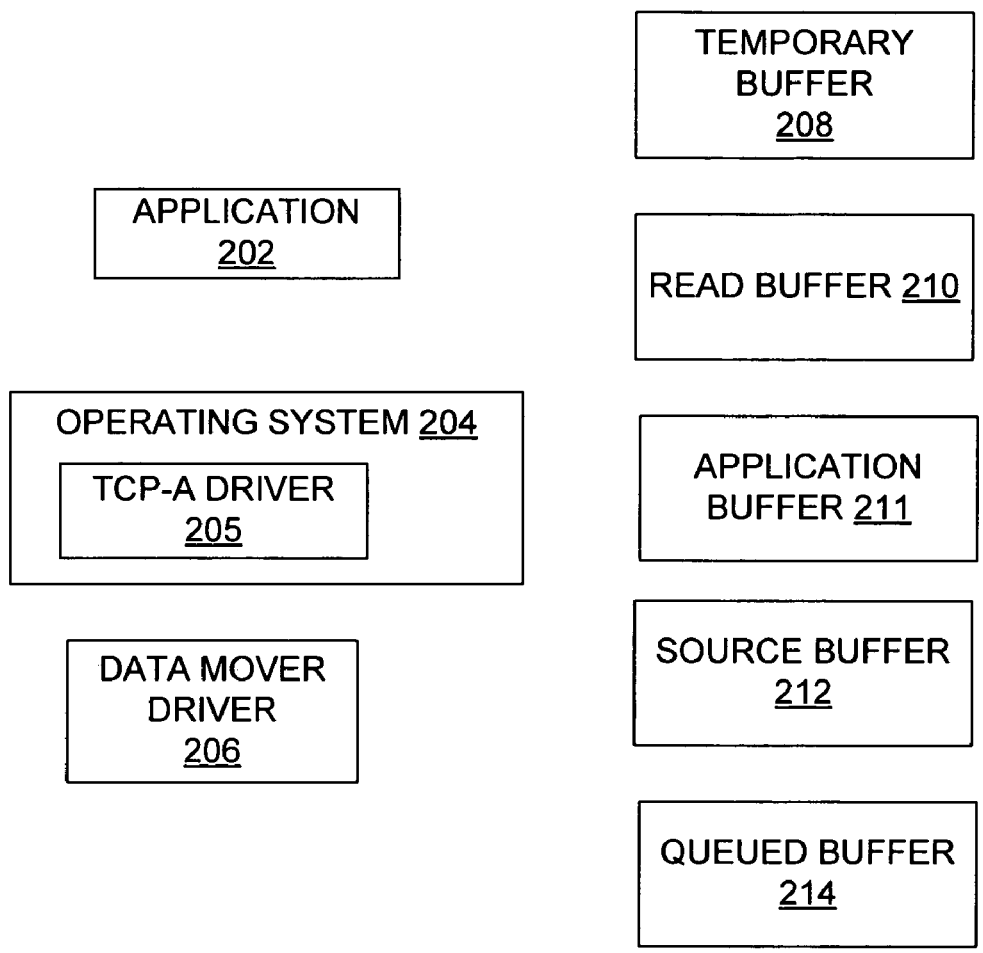
FIG. 2 depicts an example implementation of contents of a host memory that may be used in an embodiment of the present invention.

FIG. 2 depicts an example implementation of contents of a host memory that may be used in an embodiment of the present invention, although embodiments are not limited in this respect. The following contents of FIG. 2 could be machine-executable instructions that include instructions for an application 202; a set of instructions for operating system 204; a set of instructions for TCP-accelerated (TCP-A) driver 205; and/or a set of instructions for data mover driver 206. For example, the machine-executable instructions may be executed by processor 110 or other logic. Host memory may further store buffers such as temporary buffer 208, read buffer 210, application buffer 211, source buffer 212, and queued buffer 214. A "buffer" as used herein represents any area of any type of memory that can be identified by an address and that is capable of storing one or more bits.

Application 202 may include, for example, a web browser, an email serving application, a file serving application, or a database application. In conjunction with a read data request, application 202 may designate read buffer 210 from which application 202 may access the requested data. In conjunction with a transmit data request, application 202 may write data to be transmitted to source buffer 212 or other buffer such as application buffer 211.

Operating system (OS) 204 may be any operating system executable by processor 110. For example, suitable embodiments of OS 204 include, but are not limited to, Linux, FreeBSD, or Microsoft Windows compatible operating systems.

TCP-A driver 205 may perform packet processing for at least one or more packets in compliance with TCP/IP. For example, the TCP/IP protocol is described at least in the publication entitled "Transmission Control Protocol: DARPA Internet Program Protocol Specification," prepared for the Defense Advanced Projects Research Agency (RFC 793, published September 1981). Packet processing may include retrieving the header from a buffer (such as the temporary buffer), parsing the header to determine the protocol context associated with the current connection, and performing TCP protocol compliance. TCP protocol compliance may comprise, for example, verifying the sequence number of a received packet to ensure that the packet is within a range of numbers that was agreed upon between the communicating nodes; verifying the payload size to ensure that the packet is within a range of sizes that was agreed upon between the communicating nodes; ensuring that the header structure conforms to the protocol; and ensuring that the timestamps are within an expected time range.

In connection with one or more packets received from a network, TCP-A driver 205 may request data mover of the host system to transfer data and/or payloads from temporary buffer 208 to read buffer 210. In connection with one or more packets to be transmitted to a network, TCP-A driver 205 may also request data mover logic in a network component to transfer data and/or payloads as well as other information (such as a signature and/or action request) from a source or queued buffer to a network component. Each data mover may perform transfers without use of a core processing logic of a processor.

In connection with one or more packets received from a network, data mover driver 206 may schedule a request with data mover of the host system to write the one or more payloads from temporary buffer 208 to read buffer 210. In another embodiment, TCP-A driver 205 may directly program the data mover of the host system to write the one or more payloads from temporary buffer 208 to read buffer 210. Data mover driver 206 may be a standalone driver, or part of some other driver, such as TCP-A driver 205. In connection with one or more packets to be transmitted to a network, data mover driver 206 may schedule a request with a data mover of the host system to transfer one or more payload or other information from an application buffer to a source or queued buffer.

For example, temporary buffer 208 may store a header, a payload, a signature, and an action request (as the case may be) for each packet received from a network or otherwise transferred from another device. For each packet received from a network, network component may split header and payload from a packet, and post each of the header and payload into temporary buffer 208. In one embodiment, header may be posted to a first buffer in temporary buffer 208 and payload may be posted to a second buffer in temporary buffer 208. In some embodiments, network component may also store signature and action request associated with each packet into temporary buffer 208.

For example, read buffer 210 may store data and/or payloads received from a network or otherwise transferred from another device. For example, application 202 may designate destination read buffer 210 where application 202 may access the requested data and/or payloads.

For example, application buffer 211 may store payloads and other information to be transmitted to a destination device through a network or otherwise transferred to another device. For example, in conjunction with a transmit data request, data mover driver 206 may program a data mover of a host system to transfer data from an application buffer 211 to source buffer 212 or queued buffer 214.

For example, source buffer 212 may store data to be transmitted to a destination device through a network. For example, in conjunction with a transmit data request, TCP-A driver 205 may program a data mover of a network component to transmit data from source buffer 212 to the network component.

Alternatively, TCP-A driver 205 may queue a buffer, such as queued buffer 214, and the network component may read data from queued buffer 214. In one embodiment, TCP-A driver 205 may program data mover of the network component to transfer data from source buffer 212 if the data is small, and TCP-A driver 205 may queue a buffer, such as queued buffer 214, if the data is large. As used herein, "queuing a buffer" means to notify a component that there is a buffer from which it can access data. For example, TCP acknowledgment packets to acknowledge receipt of packets may typically be relatively small-sized packets and may be transferred to network component using source buffer 212. As another example, storage applications that send large files over the network may be relatively large and may be transferred to network component using queued buffer 214.

Figure 3A:
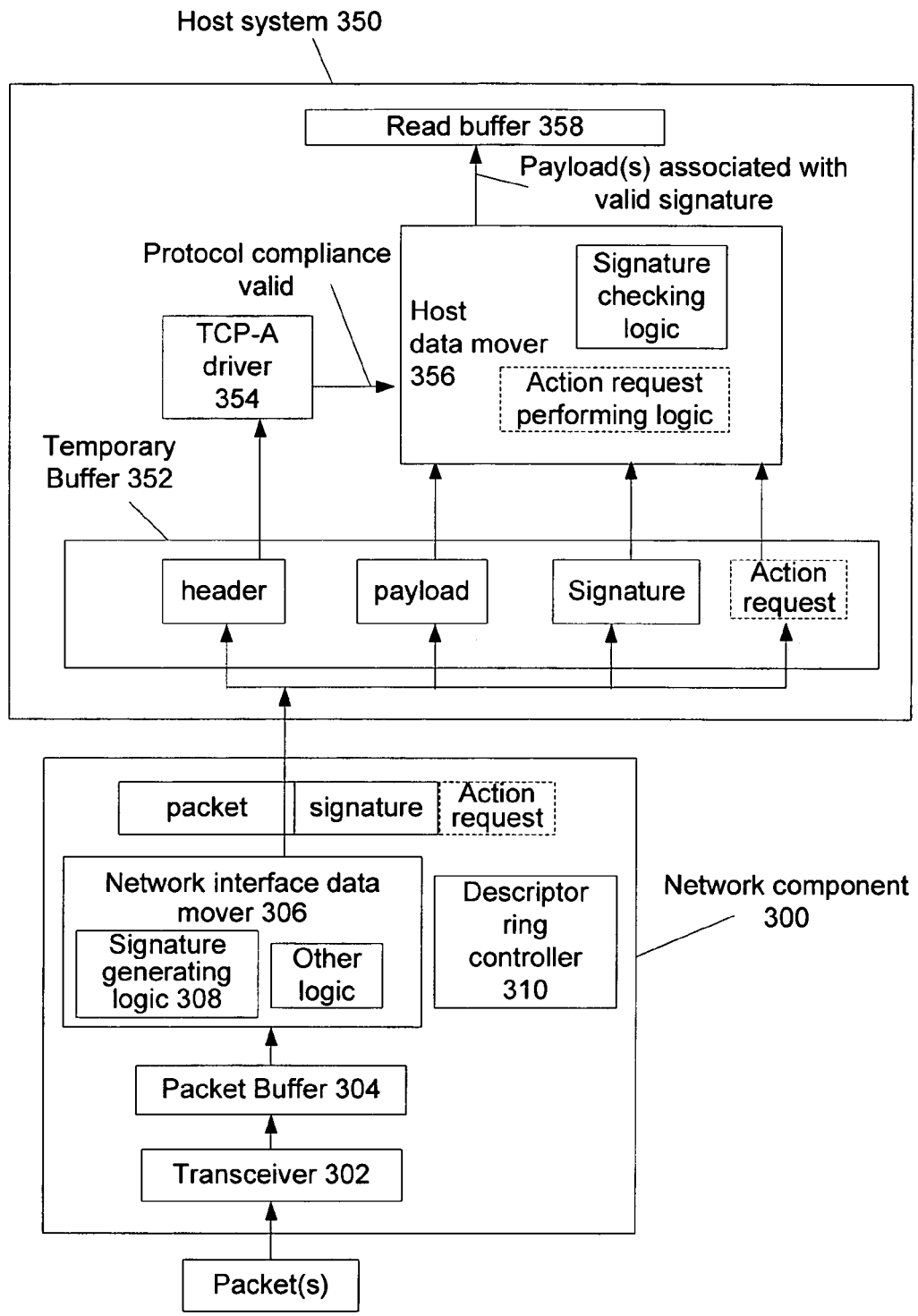
FIGS. 3A and 3B depict example operations of some embodiments of the present invention.

FIG. 3A depicts an example operation of some embodiments of the present invention that can be used in connection with transfer of packets from a network interface (or other device) to a host system. Network component 300 may receive one or more packets. As used herein, a "packet" means a sequence of one or more symbols and/or values that may be encoded by one or more signals transmitted from at least one sender to at least one receiver. Transceiver 302 may include a media access controller (MAC) and a physical layer interface (both not depicted) capable of receiving packets from a network and transmitting packets to a network in conformance with the protocols such as Ethernet as described in IEEE 802.3, although other protocols may be used. Transceiver 302 may receive packets from a network and transmit packets to a network via a network medium. Transceiver 302 may transfer packets received from a network to packet buffer 304.

Packet buffer 304 may at least store one or more packet received from a network. Network interface data mover 306 may transfer packets and associated signatures to temporary buffer 352 of host system 350. In some embodiments, network interface data mover 306 may include logic for moving data from a source to a destination without using the core processing module of a processor, such as processor 110, or otherwise does not use cycles of a processor to perform data copy or move operations. Network interface data mover 306 may include, for example, a direct memory access (DMA) engine.

In some embodiments, network interface data mover 306 may include signature generating logic 308 to generate a signature for one or more packets received from a network. For example, a signature may be a checksum, computed cyclical redundancy checking (CRC) value, or other computed value based on one or more portion of the one or more packet. For example, the first few bytes of the packet payload may be used as the signature. For example, where receive side scaling (RSS) is supported by the network component, a signature for a packet may be generated using logic to determine an RSS hash value. For example, the RSS hash value may be generated based on the MAC header, IP header, and TCP header associated with the one or more packet. Network interface data mover 306 may transfer the signature associated with the one or more packet to temporary buffer 352.

In some embodiments, network interface data mover 306 may in addition or as an alternative to determining a signature for one or more packets, determine an action request associated with one or more packets. For example, an action request may include a request to decrypt and may specify a decryption scheme to use. For example, network interface data mover 306 may include logic to provide an action request of whether to decrypt one or more packets and may specify a decryption scheme to use, although other action requests may be provided. Examples of decryption algorithms include but are not limited to SSL, RC4, Data Encryption Standard (DES), and DDS. For example, the decryption scheme may be determined by inspecting TCP headers and application headers associated with one or more packets. Other action requests may be provided such as but not limited to hashing functions (such as, but not limited, to US Secure Hash Algorithm 1 (SHA1) described in RFC 3174), compression and decompression, and marker insertion and removal. For example, network interface data mover 306 may include logic to provide the action requests.

In some embodiments, as an alternative, transceiver 302 may include logic with the capability to generate a signature and action request for each packet.

Descriptor ring controller 310 may coordinate the transfer of packets and signatures as well as action requests to locations within temporary buffer 352 of host system 350. For example, descriptor ring controller 310 may use descriptors transferred to and from host system 350 to coordinate transfer of packets and other information to host system 350.

Temporary buffer 352 of host system 350 may store a header, payload, signature, and action requests associated with each packet. For example, network interface data mover 306 may split header and payload from each packet, and post each of the header and payload into temporary buffer 352. In some embodiments, the signature may be stored adjacent to the payload.

TCP-A driver 354 may perform packet processing for at least one or more packets in compliance with TCP/IP, although other processing in accordance with other protocols may be used. For example, in response to successful protocol processing of a header, TCP-A driver 354 may request use of host data mover 356 to transfer one or more payloads from temporary buffer 352 to read buffer 358. In some embodiments, host data mover 356 may include logic for moving data from a source to a destination without using the core processing module of a host processor, such as processor 110, or otherwise does not use cycles of a processor to perform data copy or move operations. Host data mover 356 may include, for example, a direct memory access (DMA) engine.

In some embodiments, host data mover 356 may include logic to verify that a signature associated with one or more packets is correct. For example, the signature checking logic may determine a signature for one or more packet in a similar manner as logic used in the network component to generate the signature. If the signature computed by host data mover 356 matches the signature provided by network component 300, then the packet payload is cleared for additional processing or use by host system 350. Accordingly, by use of signature checking logic, host system 350 may control which network components can utilize logic of host system 350. For example, in response to the signature computed by host data mover 356 matching the signature provided by network component 300, host data mover 356 may transfer the one or more payload(s) from temporary buffer 352 to read buffer 358. Read buffer 358 may store payloads that can be accessed by applications or other logic.

In some embodiments, host data mover 356 may include action request performing logic to perform an action request associated with one or more packets. For example, an action request may include a request to decrypt one or more packet in accordance with decryption scheme specified in the action request. However, other action requests may be performed.

In some embodiments, signature checking logic and action request performing logic are performed using instructions executed by a processor as opposed to logic of host data mover 356. In some embodiments, signature checking logic and action request performing logic are separate from host data mover 356. In some embodiments, signature checking may occur prior to processing of the packet for protocol compliance.

In some embodiments, host system 350 is capable of receiving packets and associated signatures and/or action requests from multiple network components.

Figure 3B:
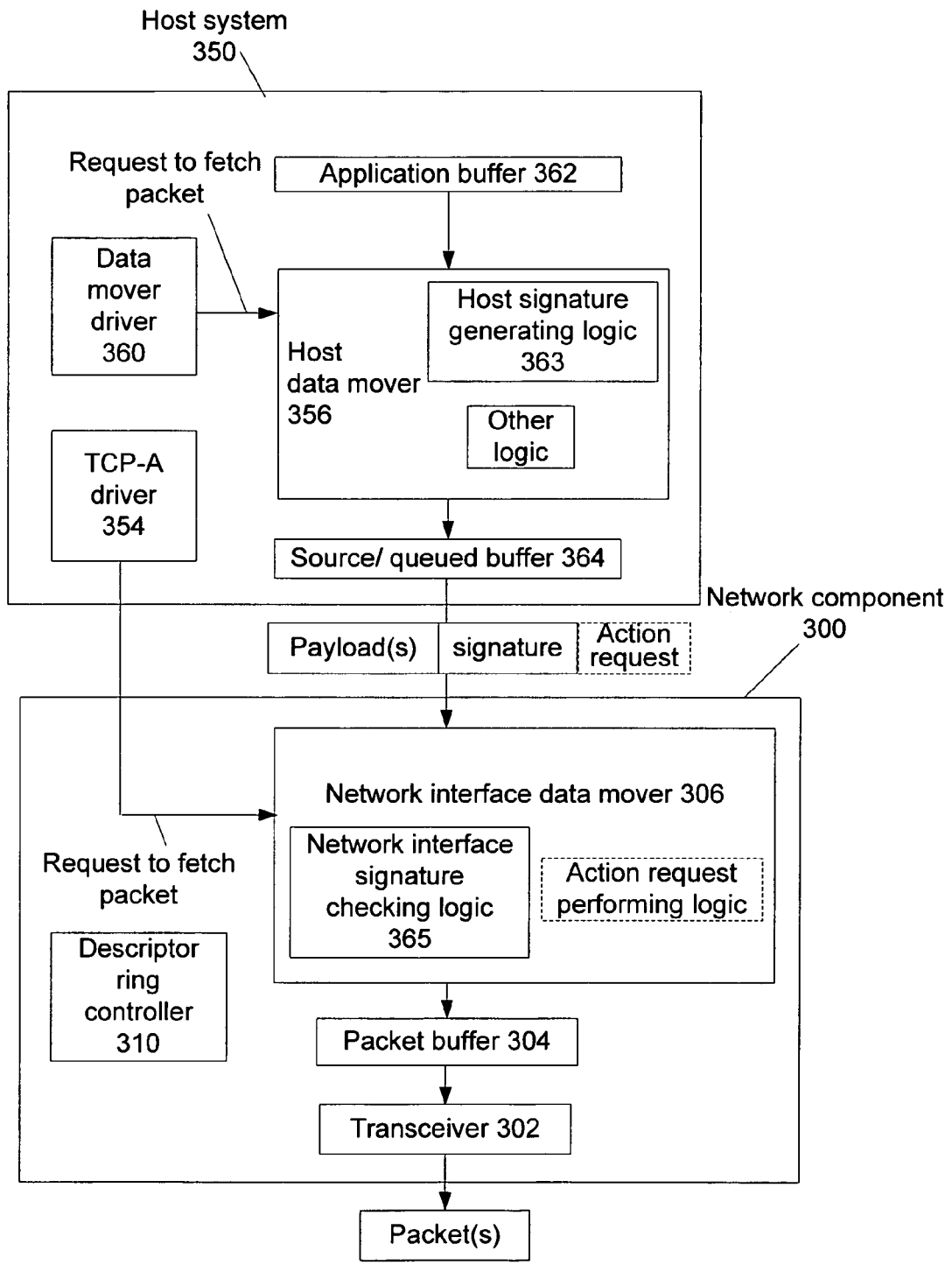

FIG. 3B depicts an example operation of some embodiments of the present invention that can be used in connection with transfer of information from a host system to a network interface for transmission to a network.

In some embodiments, although not limited in this respect, in connection with a transmission of one or more payload or other information in one or more packet to a destination device, data mover driver 360 may initiate transfer by host data mover 356 of one or more payload or other information from application buffer 362 to a source or queued buffer 364 in the host system. For example, application buffer 362 may store payloads and other information designated by an application for transmission to a destination node.

In some embodiments, host data mover 356 may include host signature generating logic 363 which may have the capability to generate a signature for one or more payload or other information to be transmitted to a destination node using network component 300. For example, host signature generating logic 363 may generate signatures over one or more payload or other information in a similar manner as described with respect to signature generating logic 308 of FIG. 3A.

In some embodiments, host data mover 356 may include logic to generate action requests associated with one or more payload or other information. Action requests may be similar to those described with regard to FIG. 3A.

In some embodiments, although not limited in this respect, TCP-A driver 354 may initiate transfer of one or more payload or other information as well as an associated signature and action request from source or queued buffer 364 to packet buffer 304. For example, TCP-A driver 354 may request network interface data mover 306 to transfer the payload or other information as well as an associated signature and action request from source or queued buffer 364 to packet buffer 304. In some embodiments, network interface data mover 306 may include network interface signature checking logic 365 with the capability to verify the signature associated with one or more payload or other information. For example, network interface signature checking logic 365 may verify signatures in a manner similar to that described with regard to signature checking logic of host data mover 356 of FIG. 3A. In some embodiments, if a signature provided with one or more payload is valid, then network interface data mover 306 may transfer the one or more payload for storage into packet buffer 304. In some embodiments, if the signature provided with one or more payload is not valid, then network interface data mover 306 may not transfer the one or more payload for storage into packet buffer 304.

In some embodiments, network interface data mover 306 may include action request performing logic that may perform actions provided with one or more payload. For example, action request performing logic may perform actions in a manner similar to that described with regard to FIG. 3A. In some embodiments, action request performing logic may perform actions provided with one or more payload if the signature associated with the one or more payload is valid and prior to transfer of the one or more payload into packet buffer 304.

In some embodiments, descriptor ring controller 310 may coordinate the transfer of payloads and signatures as well as action requests to network component 300 from host system 350. For example, descriptor ring controller 310 may use descriptors to coordinate transfer payloads and signatures as well as action requests to network component 300 from host system 350.

In some embodiments, transceiver 302 may form one or more packet using one or more payload or other information stored in packet buffer 304 in accordance with relevant protocols such as but not limited to Ethernet. Transceiver 302 may transmit packets in packet buffer 304 to a destination through a network via a network medium.

Figure 4:
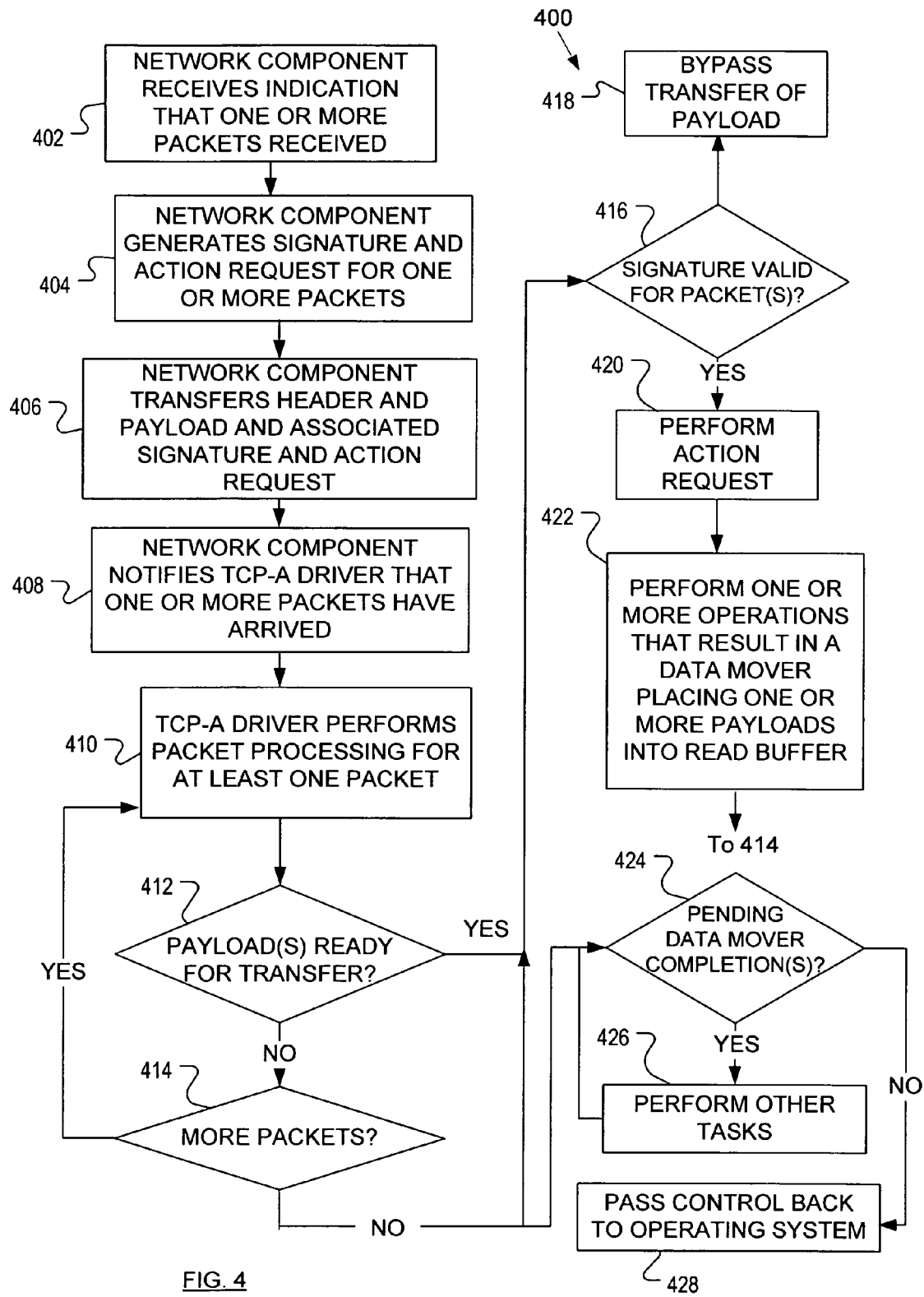
FIGS. 4 and 5 depict example flow diagrams of processes in accordance with some embodiments of the present invention.

FIG. 4 depicts an example flow diagram of a process 400 in accordance with some embodiments of the present invention. For example, process 400 may be used in connection with receipt of packets from a network. In block 402, a network component may receive an indication that one or more packet has been received from a network. Each packet may include a header and a payload portion.

In block 404, the network component may generate a signature for one or more packets and generate action requests for any of the one or more packets. In some embodiments, a signature is generated for one or more packets but not an action request. In some embodiments, an action request is generated for one or more packets but not a signature. A signature may be a computed value based on one or more portion(s) of the one or more packet. For example, an action request may include a request to decrypt and may specify a decryption scheme to use. Other action requests may be specified.

In block 406, for each packet, the network component may split header and payload from packet, and post each of the header and payload as well as associated signature and action request into a temporary buffer in a host system. The one or more packets may be comprised in one or more groups, and each group of packets may be transmitted and/or received over a connection. In some embodiments, data mover logic may be used to post each of the header and payload as well as associated signature and action request into a temporary buffer. A "connection" as used herein refers to a logical pathway to facilitate communications between a first node on a network and a second node on the network. A connection may facilitate communications for one or more transactions between the first node and the second node. A "transaction" may refer to a request to send or receive data and may be initiated by an application, such as application 202, on a system, such as system 102. Each connection may be associated with a protocol context. As used herein, "protocol context" refers to information about a connection. For example, the information may include the sequence number of the last packet sent/received, and amount of memory available.

At block 408, the network component may notify a TCP-A driver that one or more packets have arrived. In one embodiment, the network component may notify the TCP-A driver by notifying an operating system in accordance with an interrupt moderation scheme. An interrupt moderation scheme refers to a condition where an interrupt may be asserted for every integer n packets received by the network component. Thus, if network component receives n or more packets, network component may notify operating system that packets have arrived. Likewise, if network component receives less than n packets, network component may instead wait until more packets are received before notifying the operating system. In one embodiment, the operating system may then notify the TCP-A driver that packets are ready to be processed.

At block 410, the TCP-A driver may perform packet processing for at least one packet. Packet processing may be performed by the TCP-A driver retrieving the header from the temporary buffer, parsing the header to determine the protocol context associated with the current connection, and performing TCP protocol compliance. TCP protocol compliance may include, for example, verifying the sequence number of a received packet to ensure that the packet is within a range of numbers that was agreed upon between the communicating nodes; verifying the payload size to ensure that the packet is within a range of sizes that was agreed upon between the communicating nodes; ensuring that the header structure conforms to the protocol; and ensuring that the timestamps are within an expected time range.

The TCP-A driver may fetch a next header to process prior to completing the processing of a current header. This may ensure that the next header is available in the host processor's cache (not shown) before the TCP-A driver is ready to perform TCP processing on it, thereby reducing host processor inactivity. The method may continue to block 412.

In one embodiment, TCP-A driver may additionally determine if a connection associated with a packet is to be accelerated prior to performing packet processing. TCP-A driver may accelerate select connections. Select connections may comprise, for example, connections that are long-lived, or which comprise large data. If TCP-A driver determines that network connection is to be accelerated, TCP-A driver may perform packet processing as that described at block 410. If TCP-A driver determines that a network connection is not to be accelerated, the method may continue to block 428.

At block 412, TCP-A driver may determine if one or more payloads placed in a temporary buffer are ready for transfer to a destination buffer such as a read buffer. A payload may be ready for transfer if, for example, the corresponding header has been successfully processed, and the destination buffer, such as read buffer, has been designated. If there are one or more payloads ready for transfer, the process may continue to block 416. If at block 412, payload is not ready for transfer, process 400 may continue to block 414.

In one embodiment, TCP-A driver may determine if there are one or more payloads ready for placement at anytime. For example, if it is determined that a payload is not ready for placement, TCP-A driver may wait for some period of time before it makes this determination again. Where a payload cannot be placed because a destination buffer does not exist, for example, TCP-A driver may alternatively or additionally at anytime indicate to the operating system the presence of payload ready to be placed. Operating system may then designate a buffer, or may ask an application to designate a buffer. If there are one or more payloads ready for transfer, the process may continue to block 416.

At block 414, TCP-A driver may determine if there are more packets to process, for example in a temporary buffer, of the n packets for the current interrupt. If there are more packets to process, process 400 may revert to block 410. If there are no more packets to process, and one or more packets have not been previously placed and are ready for placement, process 400 may continue to block 416. If there are no more packets to process, and there are no previously processed packets to place, process 400 may continue to block 424.

At block 416, a data mover may check validity of a signature associated with one or more packets. For example, the data mover may be located in a host system or be otherwise accessible for use by the host system. For example, checking validity of a signature may include determining a signature for one or more packet in a similar manner as that used in the network component to generate the signature. If the signature determined in block 416 matches the signature provided by the network component, then block 420 may follow. If the signature determined in block 416 does not match the signature provided by the network component, then block 418 may follow.

In some embodiments, the data mover may perform the signature check prior to processing the packet for protocol compliance.

At block 418, the process may bypass transfer of the one or more payload for which signature validation failed. For example, block 418 may include the process not transferring the one or more payload to an application buffer and permitting the one or more payload to be overwritten. Block 414 may follow block 418 (not depicted).

At block 420, the process may perform an action request associated with one or more packet. The action request may be provided by a network component or other device. For example, an action request may include a request to decrypt one or more packet in accordance with specified decryption schemes. However, other action requests can be specified. Block 422 may follow block 420.

At block 422, TCP-A driver 205 may perform one or more operations that result in the data mover placing one or more corresponding payloads into a read buffer, such as read buffer 210. By using the data mover for placement of data, host processor may be freed from the overhead of performing data movements, which may result in the host processor running at much slower memory speeds compared to the core processing module speeds. Following the data mover scheduling, the method may revert to block 414 to determine if there are additional packets to process.

At block 424, TCP-A driver may determine if there are any pending data mover completions for the current interrupt. Alternatively, TCP-A driver may look for data mover completions at anytime. A "pending completion" as used herein refers to the completion of a request. In one embodiment, a pending completion refers to the completion of a request to data mover to write one or more payloads. In one embodiment, a pending completion refers to the completion of a request to data mover to transfer one or more payloads. If, at block 424, there are one or more pending data mover completions for the current interrupt, process 400 may continue to block 426. If, at block 424, there are no pending data mover completions for the current interrupt, process 400 may continue to block 428.

At block 426, TCP-A driver may perform other tasks. Other tasks may include looking for more packets in a subsequent interrupt, setting up the data mover to issue an interrupt upon completion of a last queued task for the current interrupt, or other housekeeping, such as transmitting data, and performing TCP timer related tasks. After performing other tasks, process 400 may revert to block 424.

At block 428, TCP-A driver may pass control back to operating system. If one or more packets have still not been processed, operating system may notify a TCP driver (not shown) rather than TCP-A driver 205, where the TCP driver may perform TCP stack processing by performing packet processing, and by using the core processing module of host processor to perform data transfers. If all packets have been processed, operating system may wait for a next interrupt.

Figure 5:
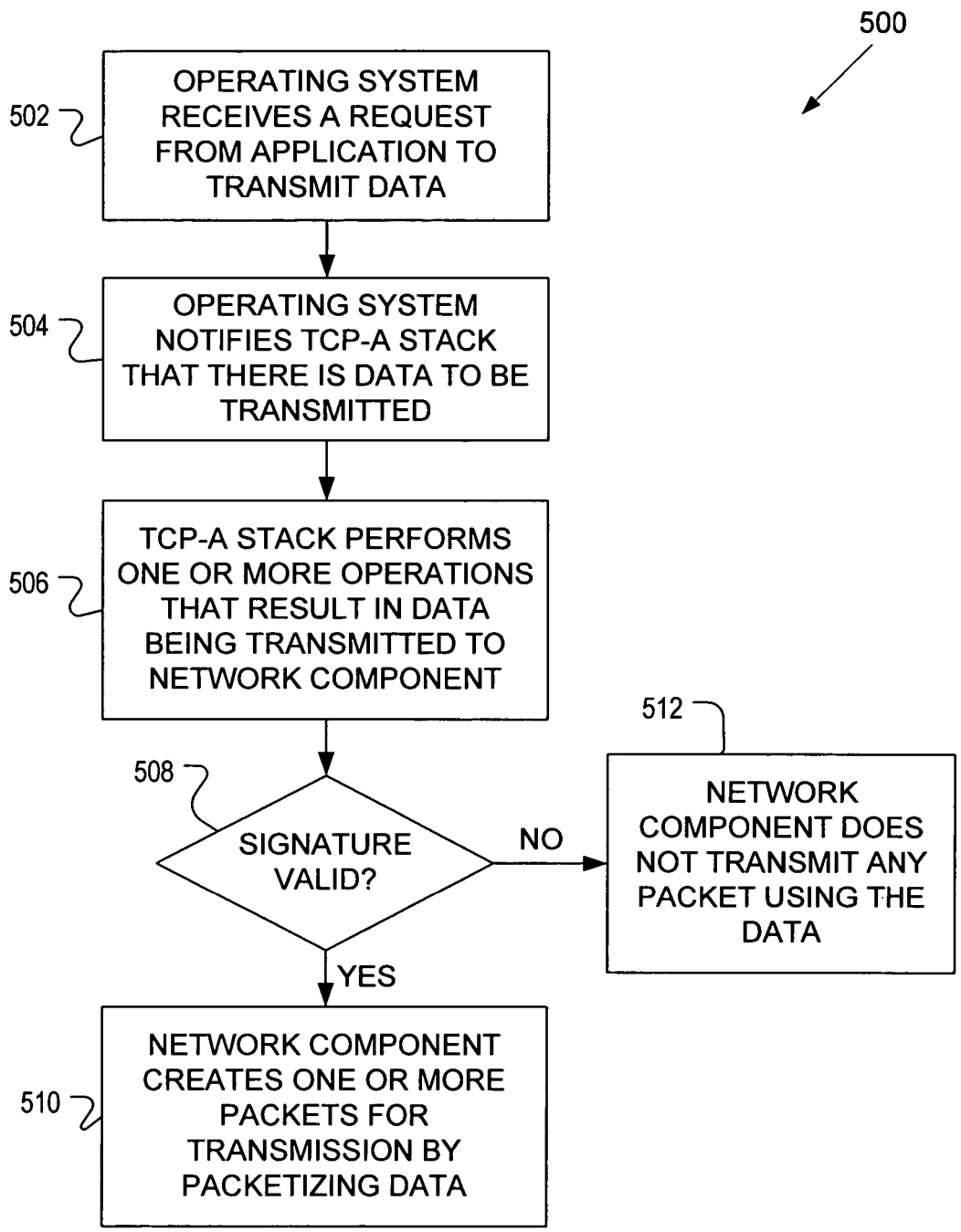

A method according to another embodiment is illustrated in FIG. 5. For example, process 500 may be used in connection with transmission of packets to a network. The method begins at block 502 where an operating system (such as but not limited to operating system 204) may receive a request from an application (such as but not limited to application 202) to transmit data placed in source buffer (such as but not limited to source buffer 212). Operating system may perform preliminary checks on data. Preliminary checks may include, for example, obtaining the associated protocol context. In a TCP/IP connection, for example, protocol context may comprise packet sequence numbers to identify the order of the packets, buffer addresses of buffers used to store data, and timer/timestamp information for retransmissions.

In some embodiments, block 502 may include a data mover driver requesting transfer of one or more payload or data from an application buffer to a source or queued buffer by use of a data mover in or accessible by a host system. In some embodiments, in block 502, the data mover in or accessible by a host system may generate a signature associated with one or more data. For example, the signature may be generated in a similar manner as described with respect to block 404. In some embodiments, in block 506, data mover of the host system or other logic may generate an action request associated with one or more data. For example, the action request may be generated in a similar manner as described with respect to block 404.

At block 504, operating system may notify TCP-A driver (such as but not limited to TCP-A driver 205) that there is one or more payload or data to be transmitted from a buffer.

At block 506, TCP-A driver 205 may perform one or more operations that result in data being transmitted to network component. For example, these one or more operations may include TCP-A driver programming a data mover to transmit one or more payload or data from source buffer 212 to network component. For example, the data mover used in block 506 may be accessible to the network component. Alternatively, TCP-A driver may queue a buffer, such as but not limited to queued buffer 214, to network component, where network component may instead read one or more payload or data from queued buffer. The source buffer may be designated for example by the application (such as but not limited to application 202), for example, whereas queued buffer 214 may be designated by the network component, for example.

In some embodiments of block 508, data mover logic used by a network component may check validity of a signature associated with one or more payload or data provided by a host system. For example, checking validity of a signature may include determining a signature for one or more payload or data in a similar manner as that used in the host system to generate the signature. If the signature computed in block 508 matches the signature provided by network component and associated with the one or more payload or data, then block 510 may follow. If the signature computed in block 508 does not match the signature provided by network component, then block 512 may follow.

At block 510, in response to receiving the one or more payload or data, network component may create one or more packets for transmission by packetizing the one or more payload or data. In one embodiment, network component may packetize one or more payload or data by performing segmentation on the one or more payload or data. "Segmentation" refers to breaking the one or more payload or data into smaller pieces for transmission. In one embodiment, network component may comprise a MAC, and segmentation may be referred to as a large send offload, wherein MAC frames may be created for transmission of one or more payload or data over the network. Network component may receive one or more payload or data directly from TCP-A driver, or by accessing queued buffer.

In some embodiments, in block 510, the network component may perform an action request associated with the one or more payload or data. In some embodiments, data mover logic accessible to the network component may perform the action request.

At block 512, the network component may not transmit any packet with the received one or more payload or data. For example, the one or more payload or data may be made available to be overwritten.

Thereafter, operating system may send a completion notification to application. Furthermore, source buffer may be returned to application, and application may use the buffer for other purposes.

In some embodiments, a TCP driver is used in place of a TCP-A driver. For example a TCP driver may perform TCP stack processing by performing packet processing, and by using the core processing module of a host processor to perform one or more payload or data transfers.

Embodiments of the present invention may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   receiving at least one packet and associated first signature for storage in a first buffer, wherein the first signature is to be generated, at a first device, based on a select portion of the at least one packet;
   validating protocol compliance of the at least one packet;
   validating the first signature of the at least one packet, wherein validating the first signature comprises:
      generating a second signature, at a second device coupled to the first device via a bus, based on the select portion of the at least one packet; and
      comparing the first signature and the second signature; and
   selectively transferring a portion of the at least one packet in response to successful signature validation using a data mover logic that results in the portion of the at least one packet being stored in a second buffer.

2. The method of claim 1, further comprising:
   receiving the at least one packet from a network;
   transferring the at least one packet and associated signature for storage in the first buffer.

3. The method of claim 1, wherein the validating the first signature comprises:
   generating a value based on a portion of the at least one packet; and
   comparing the value with the first signature associated with the at least one packet.

4. The method of claim 1, further comprising:
   receiving an action request associated with the at least one packet; and
   selectively performing the action request in response to the first signature validation.

5. The method of claim 4, further comprising:
   generating the action request based on a portion of the at least one packet; and
   transferring the at least one packet and associated action request for storage in the first buffer.

6. The method of claim 4, wherein the action request comprises a request to decrypt at least a portion of the at least one packet.

7. The method of claim 1, wherein the data mover logic performs the validating of the first signature.

8. An apparatus comprising:
   a first buffer to store at least one packet and an associated first signature, wherein the first signature is to be generated, at a first device, based on a select portion of the at least one packet;
   logic to validate protocol compliance of the at least one packet;
   logic to validate the first signature of the at least one packet, wherein the logic to validate the first signature is to;
      generate a second signature, at a second device coupled to the first device via a bus, based on the select portion of the at least one packet; and
      compare the first signature and the second signature; and
   logic to selectively transfer the at least one packet in response to signature validation.

9. The apparatus of claim 8, further comprising:
   logic to receive the at least one packet from a network;
   logic to transfer the at least one packet and the first signature for storage in the first buffer.

10. The apparatus of claim 8, wherein the first signature comprises a value based on a computation involving a portion of the at least one packet.

11. The apparatus of claim 8, wherein the first buffer is to receive an action request associated with the at least one packet and further comprising:
    logic to perform the action request.

12. The apparatus of claim 11, further comprising:
    logic to receive the at least one packet from a network;
    logic to generate the action request based on the at least one packet; and
    logic to transfer the at least one packet and associated action request for storage in the first buffer.

13. The apparatus of claim 11, wherein the action request comprises a request to decrypt at least a portion of the at least one packet.

14. The apparatus of claim 8, wherein the logic to transfer comprises a data mover.

15. A system comprising:
    a host system comprising a processor and a non-volatile memory device;
    a bus; and
    a chipset to communicatively couple the host system to the bus, wherein the chipset comprises a network component and the host system further comprises:
       a first buffer to store at least one packet and an associated first Signature, wherein the first signature is to be generated, at a first device, based on a select portion of the at least one packet,
       logic to validate protocol compliance of the at least one packet,
       logic to validate the first signature of the at least one packet, wherein the logic to validate the first signature is to:
          generate a second signature, at a second device coupled to the first device via the bus, based on the select portion of the at least one packet; and
          compare the first signature and the second signature, and
       logic to selectively transfer the at least one packet in response to signature validation.

16. The system of claim 15, wherein the network component comprises:
    logic to receive the at least one packet from a network;
    logic to transfer the at least one packet and associated signature for storage in the first buffer.

17. A method comprising:
    transferring one or more data from a first buffer to a second buffer, wherein the transferring includes generating a first signature, at a first device, associated with the one or more data based on a select portion of the one or more data;
    generating, at a second device coupled to the first device via a bus, a second signature associated with the one or more data based on the select portion of the one or more data;
    selectively transferring the one or more data from the second buffer to a third buffer using a data mover logic based on a determination that the first signature is valid, wherein determination of the validity of the first signature is based on comparison of the first and second signatures; and generating one or more packet using the one or more data stored in the third buffer.

18. The method of claim 17, wherein the transferring one or more data from a first buffer to a second buffer comprises generating an action request associated with the one or more data.

19. The method of claim 18, wherein the selectively transferring the one or more data from the second buffer to a third buffer comprises performing the action request associated with the one or more data.

20. The method of claim 18, wherein the action request comprises a request to decrypt at least a portion of the one or more data.

21. The method of claim 18, wherein the data mover logic validates the first signature.

22. The method of claim 18, wherein the data mover logic performs an action request.

* * * * *